United States Patent [19]

Southerling et al.

[11] 4,383,600
[45] May 17, 1983

[54] ROLL PRODUCT ACCUMULATOR

[75] Inventors: H. Edward Southerling, Lansdowne; Charles H. Wills, Broomall, both of Pa.

[73] Assignee: Scott Paper Company, Philadelphia, Pa.

[21] Appl. No.: 136,539

[22] Filed: Apr. 2, 1980

[51] Int. Cl.$^3$ .............................................. B65G 1/00
[52] U.S. Cl. ..................................... 198/347; 198/482
[58] Field of Search .............. 198/347, 360, 362, 365, 198/367, 369, 372, 482, 484, 598, 703, 706, 796, 797, 802, 646, 535, 560

[56] References Cited

U.S. PATENT DOCUMENTS

| | | | |
|---|---|---|---|
| 837,239 | 11/1906 | Mooney | 198/703 |
| 1,756,553 | 4/1930 | Hippenmeyer | 198/483 |
| 2,342,393 | 2/1944 | Feige | 198/560 |
| 3,033,342 | 5/1962 | Kinnicutt | 198/483 |
| 3,240,356 | 3/1966 | Hill | 198/483 |
| 3,499,555 | 3/1970 | Wahle | 198/347 |
| 3,762,582 | 10/1973 | Barnhart et al. | 198/347 |
| 4,142,626 | 3/1979 | Bradley | 198/796 |

FOREIGN PATENT DOCUMENTS

| | | | |
|---|---|---|---|
| 257209 | 5/1963 | Australia | 198/706 |
| 668854 | 6/1979 | U.S.S.R. | 198/372 |

Primary Examiner—Joseph E. Valenza
Attorney, Agent, or Firm—J. H. Yamaoka; J. W. Kane, Jr.

[57] ABSTRACT

An apparatus for transversely directing a roll, or log 10, from a work station 84 into a storage carrier 20 and for transversely unloading the log 10 from the carrier 20 onto the work station 84. The accumulator has a plurality of pivotally mounted storage carriers 20 which move along a path by the work station 84. A kicker assembly 86 transversely directs a log 10 into the path of a log carrier 20. A stationary stop 108 located adjacent that side of the log carrier 20 path that is away from the kicker assembly 86 deflects a directed roll so that it falls into the log carrier 20. A second stationary stop 106 is located adjacent the carrier path on the side of the carrier path that is closest to the kicker assembly 86 also deflects a directed roll into the log carrier 20. The apparatus for unloading a carrier includes a discharge pan 60, which is pivotally mounted so that it can be located between the work station 84 and the log carrier 20 path. As the log carriers 20 move in a discharge direction, a cam roller 30 mounted on the log carrier 20 contacts the surface 34 of a tilt cam 32 mounted in the accumulator. As the log carrier 20 continues to move in the discharge direction, the action of cam roller 30 against cam surface 34 causes the log carrier 20 to rotate and the roll 10 contained in log carrier 20b rolls out of the log carrier onto a rolldown surface 64 of the discharge pan 60 and onto the work station 84. Stop means 90a and 90b prevent a discharged log 10 from rolling away from the work station 84. Tilt cam 32 is pivotally mounted so that it can be retracted to a position such that cam surface 34 does not contact cam roller 30 when log carrier 20 is traveling in the accumulate direction. Similarly, discharge pan 60 is pivotally mounted so that it can be retracted to a position such that the edge 66 of the rolldown surface 64 does not extend into the path of the log carriers 20 when the log carriers 20 travel in the accumulate direction, and so that the rolldown surface 64 will not interfere with the loading of a log 10 into a log carrier 20 from the work station 84.

6 Claims, 2 Drawing Figures

ROLL PRODUCT ACCUMULATOR

TECHNICAL FIELD

This invention relates generally to an accumulator system that provides temporary storage for rolls, or logs, or rewound paper such as toilet tissue or paper towels. This invention is specifically directed to an apparatus for transversely loading a log from a work station into a storage carrier of the accumulator and for transversely unloading a log from the carrier onto the work station.

BACKGROUND ART

U.S. Pat. No. 3,016,780, issued Jan. 16, 1962, to D. W. Mosen describes a log accumulator in which a plurality of fingers, which serve as log carriers, are mounted on a pair of sprocket driven endless chains. The fingers have a shallow groove in which the log rests. The accumulator is loaded by means of a conveyor which longitudinally directs the log between adjacent carrier fingers of the accumulator. When the accumulator is indexed in the accumulate direction, the carrier fingers lift the log from the conveyor. The accumulator is unloaded by indexing the accumulator in the discharge direction which causes a log to be placed on the accumulator conveyor. A pneumatically operated pusher plate transversely pushes the log off the conveyor onto a support bar located alongside the accumulator.

Another log accumulator is described in U.S. Pat. No. 3,762,582, issued Oct. 2, 1973, to R. E. Barnhart, et al. Barnhart, et al. also describe an accumulator in which the log carriers are supported by a pair of sprocket driven endless chains. End support members of the log carrier are pivotally mounted so that the log carriers always remain in an upright position regardless of the direction of travel of the chain. When a log carrier is at the loading station, it is in axial alignment with in-feed and out-feed conveyors. The log carrier is loaded by the in-feed conveyor, with the assistance of a pusher, which longitudinally directs a log onto the carrier. The accumulator is then indexed in an accumulate direction to store the log. Unloading is accomplished by indexing the accumulator in the discharge direction which causes a log to be placed at the load/unload station. The pusher then longitudinally pushes the log off of the carrier onto the out-feed conveyor.

Accumulators that are loaded and unloaded at the same station, such as those described in the Mosen and Barnhart et al. patents, are generally referred to as last in, first out accumulators because the last roll to be accumulated is the first roll to be discharged. The Mosen and Barnhart et al. accumulators were both loaded by longitudinally directing a log over a carrier. The Barnhart et al. accumulator is discharged by longitudinally directing the log off of the carrier while the Mosen accumulator is discharged by transversely pushing the log off of the carrier.

Another sprocket driven endless chain accumulator is described in U.S. Pat. No. 4,142,626, issued Mar. 6, 1979 to J. J. Bradley. The log carriers are supported by the chains and are pivotally mounted so that the log carriers remain upright as they travel through the accumulator. The carriers are loaded from a rolldown table located alongside the accumulator. A butterfly feed mechanism, located between the rolldown table and the carrier to be loaded, transversely drops a log into the carrier. As a loaded log carrier approaches an unloading station, a trip mechanism engages a trip pin mounted on the log carrier which rotates the carrier and causes a log to be transversely unloaded onto a conveyor.

U.S. Pat. No. 4,168,776, issued Sept. 25, 1979 to C. H. W. Hoeboer, also describes a sprocket driven endless chain accumulator in which the carrier members are supported by the chains. Carrier loading is accomplished by means of an inclined, rolldown table that transversely extends into the path of the carriers. Stops at the end of the table position the log over a log carrier. When the accumulator is indexed, the carrier lifts the log off of the table. As a loaded log carrier approaches the unloading station, a cam surface on the carrier cooperating with a pin mounted in the accumulator causes the carrier to rotate thereby transversely directing the log onto a rolldown table.

The accumulators described in the Bradley and Hoeboer patents have separate load and unload stations and are generally referred to as first in, first out accumulators because the first log into the accumulator must travel to the unload station in order to be discharged. In the accumulators described by Bradley and Hoeboer, the logs are transversely loaded into the carriers and are transversely unloaded by rotating the carriers at the unload station.

DISCLOSURE OF INVENTION

A log carrier in an accumulator is loaded by transversely directing the log into the carrier from a work station alongside the path of the log carriers. Stop means transversely adjacent to each side of the path of the carrier to be loaded not only prevent the log from rolling out of the carrier, but also deflect the log so that it falls into the carrier. The carrier is unloaded by rotating the carrier so that the log is discharged onto a rolldown surface which guides the log onto the work station. When the accumulator is being unloaded, the rolldown surface is located between the work station and the carrier path. In that position, the rolldown surface is in the loading path of a log that is being directed from the work station into a carrier, therefore, the rolldown surface is retractably mounted and is retracted to a nonobstructing position when the accumulator is being loaded. In one embodiment of the invention, the rotating of the carrier is accomplished by means of a cam roller mounted on the carrier cooperating with a cam surface mounted in the accumulator. Since it may be desirable not to rotate the carriers when logs are being loaded into the accumulator, the cams in the accumulator are retractably mounted so that they can be retracted to a position where they cannot contact the cam rollers mounted on the log carriers.

BRIEF DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

BEST MODE FOR CARRYING OUT THE INVENTION

Figure 2:
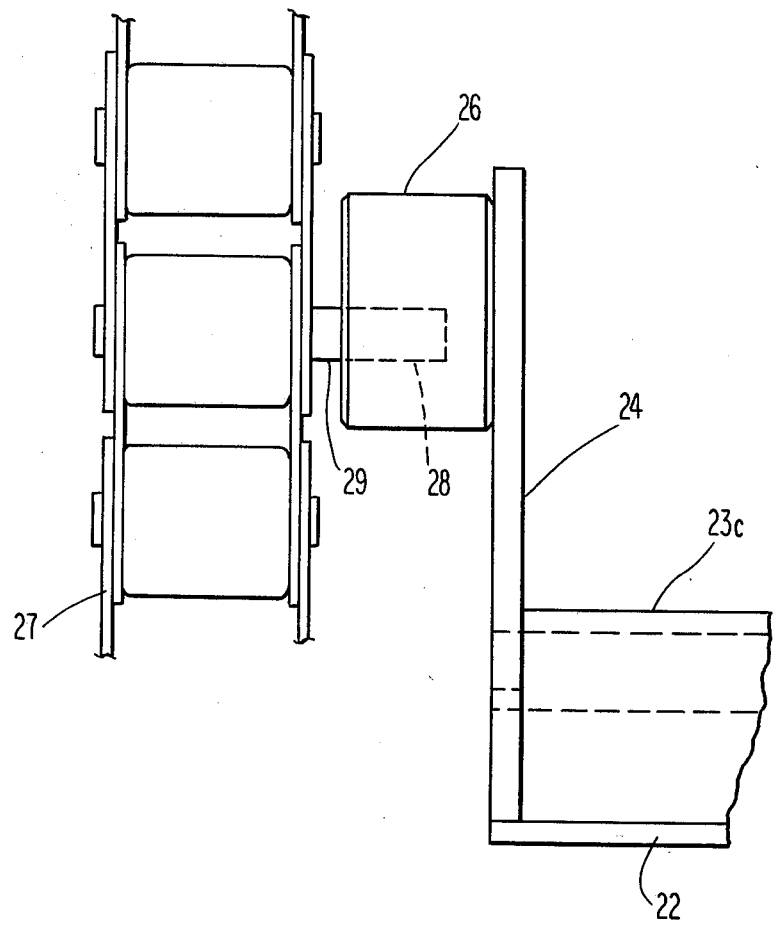
FIG. 2 is a fragmentary section taken along the line 2—2 of FIG. 1.

For the sake of convenience, an element depicted in more than one figure will retain the same element number in each figure. The accumulator consists of a plurality of log carrier assemblies 20 supported on a pair of endless sprocket-driven chains 27 as partially shown in FIG. 2. The entire accumulator including the endless chains, sprockets and the means for driving the sprockets have not been depicted as they are well known to those skilled in the art, as represented by the patents described above, and because a detailed description thereof is not required for an understanding of this invention. Each log carrier 20 includes a carrier tray 22 secured to two end plates 24. A support bearing 26 is fastened to each end plate 24 by means of bolts (not shown). Each chain 27 is commonly known as ANSI extended pin roller chain and is readily available from most manufacturers of roller chain. Pins 29, which are spaced every 0.254 meters (10 inches) along the chain 27, extend into a support hole 28 in the support bearing 26, thereby supporting the log carrier 20 between the chains 27. Pin 29 fits loosely into the support hole 28 so that log carrier 20 remains in an upright position, even though the chain travels through a serpentine path through the accumulator. Also secured to each end plate 24 is a cam roller 30.

Mounted within the accumulator is a tilt cam 32 having a camming surface 34. Tilt cam 32 is secured to a shaft 36 which also has secured thereto an arm 38. Arm 38 is connected to a piston rod 42 of air cylinder 44 by means of a pin 40. Air cylinder 44 has a first inlet port 46, designated as the ACCUMULATE input port, and a second inlet port 48, designated as the DISCHARGE inlet port. When air pressure is applied to inlet port 48, the piston and piston rod 42 are driven upward and the tilt cam 32 is in the position as depicted by the solid outline 32. When air pressure is applied to inlet port 46, the piston and piston rod 42 are driven downward which causes tilt cam 32 to rotate to a retracted position as depicted by the dashed outline 50.

The accumulator system includes a discharge pan assembly shown generally at 60. The discharge pan 60 includes a rolldown surface 64 that is supported between end support members 62. The end support members 62 are secured to a shaft 68. An arm 70, which is also secured to shaft 68, is connected to a piston rod 72 of air cylinder 74 by means of a pin 73. Air cylinder 74 has a first inlet port 76, designated as the DISCHARGE inlet port, and a second inlet port 78, designated as the ACCUMULATE inlet port. When air pressure is applied to inlet port 76, the piston and piston rod 72 are driven downward and the discharge pan 60 assumes the position depicted by the solid outline 60. When air pressure is applied to inlet port 78, the piston and piston rod 72 are driven upward and the discharge pan 60 rotates to the retracted position depicted by the dashed outline 80.

The work station from which logs 10 are loaded into the accumulator or at which logs 10 will be unloaded from the accumulator is represented by a conveyor 84 which travels over a conveyor support 82 and is located alongside of the path of the log carriers 20 in the accumulator.

Figure 1:
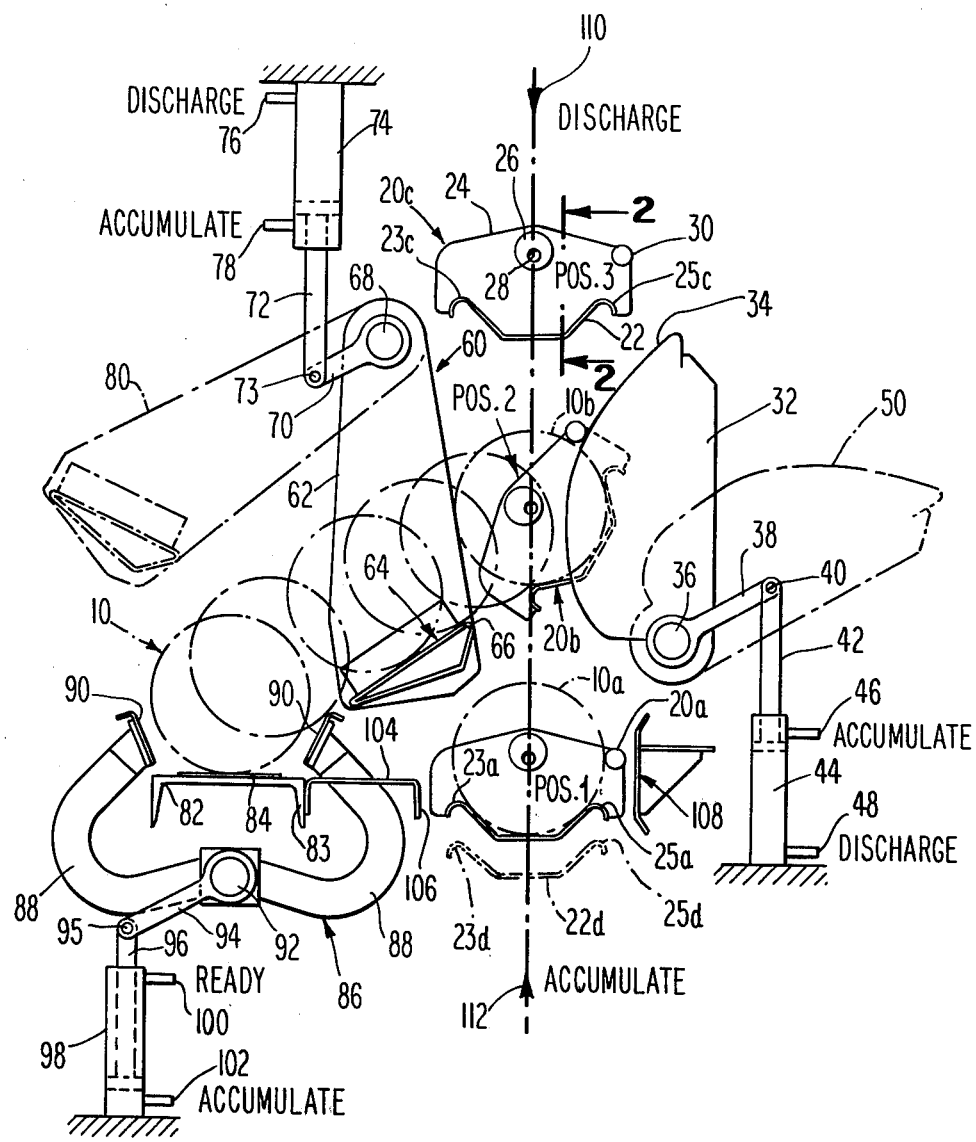
FIG. 1 is a schematic side elevation of the accumulator loading and unloading apparatus.

At the work station, there is shown a kicker assembly 86 having a pair of kicker arms 88 secured to a shaft 92. Kicker arms 88 terminate in kicker/guide bar members 90 which extend alongside conveyor 84. An arm 94, secured to shaft 92, is connected by means of pin 95 to a piston rod 96 of air cylinder 98. Air cylinder 98 has a first inlet port 100, designated as the READY inlet port and a second inlet port 102, designated as the ACCUMULATE inlet port. When air pressure is applied to inlet port 100, the piston and piston rod 96 are driven downward and the kicker assembly 86 is in the position as shown in FIG. 1. When air pressure is applied to inlet port 102, the piston and piston rod 96 are driven upward, causing the kicker arms 88 to rotate in the clockwise direction.

A channel member 104 is secured to a leg 83 of conveyor support 82. Leg 106 of channel 104 is a stationary stop means located adjacent to that side of the log carrier path that is closest to the kicker assembly 86. Channel 104 will have portions cut out to allow kicker arm 88 and kicker/guide bar 90b to freely pass between conveyor support 82 and log carrier 20. The upper surface of channel 104 acts as a guide surface for a log that is directed into a log carrier 20. Mounted within the accumulator is a stationary stop 108 which is located adjacent to that side of the carrier path that is away from the kicker assembly 86.

A description of the loading of a log carrier 20 now follows. When the accumulator is in the accumulate mode, air pressure is applied to inlet port 46 of air cylinder 44 which rotates tilt cam 32 to the retracted position depicted by dashed line 50. In the retracted position, the cam surface 34 of tilt cam 32 is not in the path of the cam rollers 30 mounted on end plates 24 of the log carriers 20. Also in the accumulate mode, air pressure is applied to inlet port 78 of air cylinder 74 which causes the discharge pan 60 to rotate to the retracted position depicted by dashed outline 80. When the discharge pan 60 is in the retracted position, it does not extend into the path of untilted log carriers 20 and does not obstruct the loading path between the conveyor 84 and log carrier 20a. The normal log carrier 20a loading position, designated as POS. 1 in FIG. 1, is alongside the work station as represented by conveyor 84. A log 10 to be loaded is longitudinally directed along conveyor 84. When log 10 is alongside log carrier 20a, air pressure is applied to inlet port 102 of air cylinder 98, which causes kicker assembly 86 to rotate in the clockwise direction. As the kicker assembly 86 rotates, kicker/guide bar 90a contacts roll 10 and transversely directs roll 10 toward log carrier 20a. Simultaneously, kicker/guide bar 90b, which is located between roll 10 and log carrier 20a, rotates down and out of the path of travel between log 10 and log carrier 20a, thereby allowing log 10 to travel into the log carrier 20a. In the event that the force applied by kicker/guide bar 90a to log 10 is excessive, one function of the stationary stop 108 is to deflect a log 10 that travels over lip 25a of the carrier tray 22a back into the carrier tray 22a. As shown in FIG. 1, the conveyor 84 is laterally displaced from the path of the log carrier 20a and the spacing between leg 83 of conveyor support 82 and the lip 23a of log carrier tray 22a can be larger than the diameter of log 10, in which case there is some possibility that a log 10 may fall between leg 83 of the conveyor support 82 and the lip 23a of log carrier 20a. Thus, it can be seen that the upper surface of channel 104 bridges the gap between the conveyor support 82 and log carrier 20a, and leg 106 of channel 104, which acts as a stop means adjacent to that side of the log carrier path that is nearest to conveyor 84, prevents a log 10 being loaded into log carrier 20a from rolling out of log carrier 20a over lip 23a. The use of stops 106 and 108 allow a large tolerance in the position of a log carrier 20a at the time of loading. For example, consider a log carrier 20 located so that the log carrier tray 22d is in the position as indicated by the dashed outline 22d. If stationary stop 108 is not present, it is quite likely that a log 10 being loaded into the accumulator would be directed over the lip 25d of the carrier tray 22d. When the stop 108 is employed, it not only prevents a log 10 being loaded into carrier 22d from overshooting the carrier tray 22d, but also deflects the log 10 so that it drops down into the log carrier tray 22d. A log 10 that is deflected off of stop 108 into log carrier tray 22d may have a tendency to roll over the lip 23d of the carrier tray 22d. The stop 106 prevents this by deflecting the log 10 back into the log carrier tray 22d. Because of stops 106 and 108, a log 10 can be loaded into a log carrier 20, even though it is a considerable distance below the normal loading position designated as POS. 1 in FIG. 1. The primary concern is to make sure that log 10 does not hit the bottom of the log carrier 20b that is approaching POS. 2 in FIG. 1. In other words, the criticality of the timing of the operation of kicker assembly 86 with respect to the position of the log carrier 20 into which the log 10 will be loaded is significantly reduced. The stops 106 and 108 also allow a fairly wide range in the force that directs the log 20 into the log carrier 20. After the log carrier 20a has been loaded, the accumulator will be indexed upward as indicated by arrow 112 which will cause the next log carrier 20 to advance toward the loading position, POS. 1.

A description of the unloading of a log carrier 20 now follows. When logs 10 are being dicharged from the accumulator, air pressure is applied to inlet port 48 of air cylinder 44 which positions the tilt cam 32 in the position depicted by the solid outline 32. In the discharge mode, air pressure is also applied to inlet port 76 of air cylinder 74 which causes the discharge pan 60 to be rotated into the position depicted by the solid outline 60 and air pressure is applied to inlet port 100 of air cylinder 98 which maintains the kicker assembly 86 in the ready position as shown in FIG. 1. When the kicker assembly 86 is in the ready position, the kicker/guide bars 90a and 90b adjacent the conveyor 84 prevent a log 10 which has been discharged onto conveyor 84 from rolling off of the conveyor 84. In the discharge mode, the log carriers travel in a downward direction as indicated by arrow 110. As a loaded log carrier 20 moves downward from POS. 3 in FIG. 1, cam roller 30 eventually makes contact with the cam surface 34 of tilt cam 32. As the log carrier 20 continues downward, it is gradually rotated in a counterclockwise direction about pins 29. When the log carrier reaches the point indicated as POS. 2 of FIG. 1, the log 10b in the carrier 20b rolls out of the carrier tray 22b onto the rolldown surface 64 of discharge pan 60 and onto conveyor 84. The kicker/guide bars 90a and 90b of kicker assembly 86 prevent the log 10 from rolling away from conveyor 84. Thus, it can be seen that the rolldown surface 64 of discharge pan 60 bridges the gap between log carrier 20b and conveyor 84 and is sloped to guide the log 10 onto the conveyor 84. Although it may be possible to locate the rolldown surface 64 so that it does not extend into the path of unrotated log carriers 20, in the preferred embodiment, the edge 66 of the rolldown surface 64 does extend into the path that would be taken by unrotated log carriers 20, and therefore, cam surface 34 is so shaped that as each log carrier 20b continues downward after it discharges the log 10, it is maintained in a rotated position so that it will clear the edge 66 of the rolldown surface 64. After the log carrier 20b has passed by the discharge pan 60, the cam surface 34 allows the log carrier 20b to return to the upright position.

Normally, just before the accumulator is switched from the accumulate mode to the discharge mode, the last log that has been stored will be in a log carrier 20 located at Position 2 of FIG. 1. Because the accumulator is in the accumulate mode, the tilt cam 32 is in the retracted position as indicated by dashed line 50 and the discharge pan 60 will also be in the retracted position as indicated by dashed line 80. When the accumulator is placed in the discharge mode, the discharge inlet port 76 of air cylinder 74 is activated slightly in advance of the discharge inlet port 48 of air cylinder 44 but the motion of the discharge pan 60 overlaps the motion of the tilt cam 32. As the tilt cam 32 advances toward the discharge position, the tilt cam surface 34 contacts cam roller 30b and begins to rotate log carrier 20 about pins 29. When the tilt cam 32 reaches the discharge position, the discharge pan 60 and the log carrier 20b will be as shown at POS. 2 in FIG. 1 and the log stored therein will be discharged onto the rolldown surface 84 and onto the conveyor 84. After this initial discharge, unloading proceeds as described in the preceding paragraph.

While the present invention has been described with reference to a specific embodiment thereof, it will be obvious to those skilled in the art that various changes and modifications may be made without departing from the invention in its broader aspects. For example, although the apparatus for loading and unloading the accumulator have been described with respect to an accumulator that is loaded and unloaded from the same station, it will be apparent to those skilled in the art that the principles described herein can be applied to an accumulator in which logs are loaded into the accumulator from one work station and are discharged from the accumulator at a second work station.

What is claimed is:

1. An improved roll accumulator system having (a) means for moving a plurality of pivotally mounted storage carriers along a path by a work station, (b) a retractably mounted discharge pan located between the work station and the carrier path, said discharge pan in an unretracted position extending into the path and interfering with the travel of upright carriers, (c) means for rotating a storage carrier when it is near the discharge pan whereby a roll is caused to roll out of the carrier onto the discharge pan and then onto the work station, and (d) means for retracting the discharge pan out of the path of unrotated carriers, wherein the improvement comprises:
   (i) means operable when the discharge pan is retracted, for causing a roll at the work station to be transversely directed into the path of a carrier; and
   (ii) stationary stop means located adjacent that side of the carrier path that is away from the roll directing means, the stop means deflecting a directed roll so that it falls into a carrier.

2. An improved roll accumulator as recited in claim 1, the improvement further comprising stop means adjacent the work station for preventing a roll discharged from a carrier from rolling away from the work station.

3. An improved roll accumulator system as recited in claim 1 wherein the means for rotating the carrier comprises a cam surface mounted in the accumulator and a cooperating cam surface mounted on the carrier.

4. An improved roll accumulator system as recited in claim 1 wherein the means for rotating the carrier comprises a cam mounted in the accumulator and a cam roller mounted on the carrier.

5. A roll accumulator system as recited in claim 4 wherein the cam is retractably mounted, the improvement further comprising:

(a) means for retracting the cam out of the path of the cam roller.

6. An improved roll accumulator system as recited in claim 1 further comprising:

(a) a second stationary stop means located adjacent the carrier path on that side of the carrier path closest to the roll directing means, the second stop means preventing a directed roll from rolling out of the carrier and deflecting the directed roll so that it falls into a carrier.

* * * * *